(12) United States Patent
Rayer et al.

(10) Patent No.: US 6,701,716 B2
(45) Date of Patent: Mar. 9, 2004

(54) BLEED VALVE ASSEMBLY

(75) Inventors: Quintin G Rayer, St Peter Port (GB); Michael F Edwards, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/159,113

(22) Filed: Jun. 3, 2002

(65) Prior Publication Data

US 2002/0189263 A1 Dec. 19, 2002

(30) Foreign Application Priority Data

Jun. 13, 2001 (GB) .............................................. 0114381

(51) Int. Cl.[7] .................................................. F02C 6/08
(52) U.S. Cl. ......................... 60/782; 251/282; 60/785; 60/795
(58) Field of Search ......................... 60/785, 795, 782; 251/282

(56) References Cited

U.S. PATENT DOCUMENTS

| 3,487,993 | A | * | 1/1970 | Rannenberg | ................. | 415/28 |
| 3,994,617 | A | * | 11/1976 | McCombs | ................... | 415/28 |
| 4,251,985 | A | * | 2/1981 | Sullivan | ....................... | 60/795 |
| 4,574,585 | A | * | 3/1986 | Conn | ........................... | 60/795 |
| 4,702,070 | A | * | 10/1987 | Cureton et al. | ............... | 60/785 |
| 4,765,131 | A | * | 8/1988 | Benson | ....................... | 60/782 |

* cited by examiner

Primary Examiner—Justine R. Yu
Assistant Examiner—William H. Rodriguez
(74) Attorney, Agent, or Firm—W. Warren Taltavull; Manelli, Denison & Selter PLLC

(57) ABSTRACT

A bleed valve 60 for regulating a fluid flow through a bleed hole 88 defined by a casing 49 of a gas turbine engine 10 compressor 22, the bleed valve 60 comprises a central axis 92, a piston 62 and a static structure 70, the static structure 70 generally surrounds the piston 62, and is arranged to define in axial sequence from the bleed hole 88 first, second and third chambers 82, 84, 86 respectively, the piston 62 comprises a spindle 66, a first end plate 90 slidably sealed against the static structure 70 and a valve face end plate 64 from which walls 68 axially extend, the walls 68 being slidably sealed to the static structure 70, the static structure 70 comprises a radially inwardly extending flange 74, the flange 74 defining an aperture 76 through which the spindle 66 axially extends and is slidably sealed against, the first chamber 82 is in fluid communication with the compressor 22 via pressure balancing apertures 108 defined in the valve face end plate 64, the third chamber 86 is also in fluid communication with the compressor 22 via a passageway 100 defined by the spindle 66, the bleed valve 60 further comprises means for moving the piston between an open position and a closed position, wherein the valve face end plate 64 comprises radially extending pressure balancing apertures 108.

10 Claims, 3 Drawing Sheets

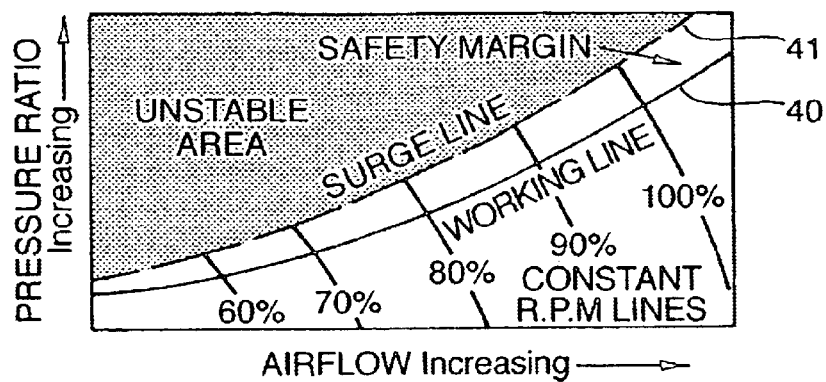
PRIOR ART Fig.2.
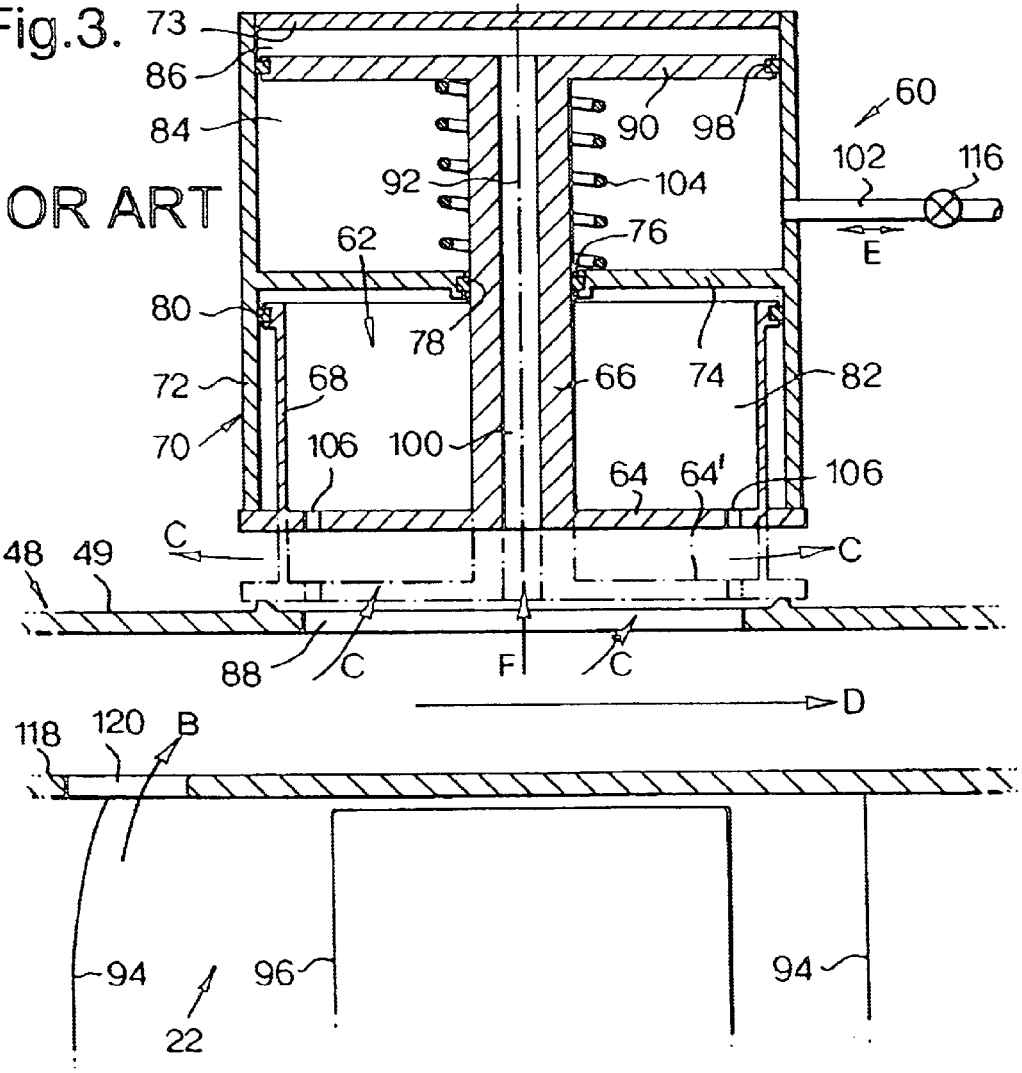
Fig.3. PRIOR ART

BLEED VALVE ASSEMBLY

FIELD OF THE INVENTION

This invention relates to an arrangement of a valve assembly and in particular although not exclusively a bleed valve assembly for a compressor stage of a gas turbine engine.

BACKGROUND OF THE INVENTION

In a multi-stage compressor of a gas turbine engine each compressor stage is designed so that it operates as efficiently as possible over as wide a range of operating conditions as possible. However, for a gas turbine engine of an aircraft there are some operational conditions that depart from the capability of the compressor stage and there can be a breakdown of air flow and/or aerodynamically induced vibration occurs. If the engine demands a pressure rise from a compressor which is higher than can be sustained then "surge" occurs. Surge is an instantaneous breakdown in flow through the engine and the high pressure air in the combustion system is expelled forward through the compressor with a resultant loss of engine thrust. Compressors are therefore designed with an adequate "surge margin" to ensure that this instability is avoided. However, too great a surge margin leads to an inefficient engine at constant operating conditions such as cruise, thus the surge margin is kept to a minimum. To help reduce this surge margin variable inlet guide vanes and variable stator vanes are used to provide an acceptable air angle on to the compressor blades. Furthermore bleed valves are used between compressor stages to further and quickly reduce the pressure therein by venting compressed air, from a compressor stage of the engine, and thereby restoring the surge margin and operability of the compressor stage.

SUMMARY OF THE INVENTION

The present invention is concerned with the design of bleed valves. Currently one type of bleed valve in use is a pressure balanced valve where the pressures both sides of a valve face are equilibrated by passage of compressed air through holes in the valve face. However, this current design does not accommodate the pressure differences sufficiently and quickly enough and unpredictable performance in some circumstances include shutting of the valves under conditions when they should remain open and the valves remaining partially open when commanded to close.

It is therefore an object of the present invention to provide bleed valve apparatus which obviates the above problem.

According to the present invention there is provided a bleed valve for regulating a fluid flow through a bleed hole, the bleed hole is defined by a casing of a gas turbine engine compressor, the bleed valve comprises a central axis, a piston and a static structure, the static structure generally surrounding the piston, and is arranged to define in axial sequence from the bleed hole first, second and third chambers, the piston comprises a spindle, walls, a first end plate slidably sealed against the static structure and a valve face end plate from which the walls axially extend, the walls being slidably sealed to the static structure, the static structure comprises a radially inwardly extending flange, the flange defining an aperture through which the spindle axially extends and is slidably sealed against, the first chamber is in fluid communication with the compressor via pressure balancing apertures defined in the valve face end plate, the third chamber is also in fluid communication with the compressor via a passageway defined by the spindle, the bleed valve further comprises means for moving the piston between an open position and a closed position, wherein the valve face end plate comprises radially extending pressure balancing apertures.

Preferably, the means for moving the piston comprises a means for supplying compressed air into and venting compressed air from the second chamber, such that supplying compressed air moves the piston between the open position and the closed position, and a resilient member disposed to and between the flange and the first end plate and which is arranged to provide a returning force to the piston to move the piston between the closed position and the open position.

Preferably, the radially extending pressure balancing apertures substantially extend from the spindle to the axial walls and comprise a constant aperture width.

Alternatively, the radially extending pressure balancing apertures comprise an aperture width which tapers radially inwardly. Alternatively, the radially extending pressure balancing apertures comprise an aperture width which tapers radially outwardly.

Preferably, the radially extending pressure balancing apertures are symmetrically disposed around the valve face end plate.

Preferably, the casing is a casing surrounding a compressor stage of a gas turbine engine. Furthermore it is preferable for a gas turbine engine to comprise a bleed valve in accordance with the present invention.

Preferably, a method of operating a gas turbine engine comprising a bleed valve in accordance with the present invention comprises the steps of: when the engine is not operating the valve is held in the open position by the force exerted by the resilient means; on engine start up compressor air enters and pressurises the third chamber sufficiently to overcome the force exerted by the resilient means and forces the piston to move between the open position and the closed position, thereby preventing compressor air passing through the bleed hole, during this step air is vented from the second chamber via the means for supplying compressed air into and venting compressed air from the second chamber; at a first normal operating condition of the engine the bleed valve is closed; during a transient engine operating stage, between the first and a second normal operating condition, and when the pressure in the compressor reaches a predetermined level the means for supplying compressed air is commanded to permit compressed air into the second chamber, at a sufficient pressure, to move the piston between the closed position and the open position, thereby allowing compressor air to be exhausted through the bleed hole and reducing the pressure in the compressor; during the transient engine operating stage and when the pressure in the compressor drops below the predetermined level the means for supplying compressed air is commanded to permit venting of compressed air from the second chamber, in so doing the pressure in the third chamber is sufficient to move the piston between the open position and the closed position, thereby preventing compressor air exhausting through the bleed hole.

BRIEF DESCRIPTION OF THE DRAWING

The present invention will now be described, by way of example, with reference to the accompanying drawings in which:

FIG. 2 shows a surge margin of a typical gas turbine engine over a range of operating outputs;

FIG. 3 is a detailed section of a prior art bleed valve showing a prior art face end plate;

DETAILED DESCRIPTION OF THE INVENTION

Figure 1:
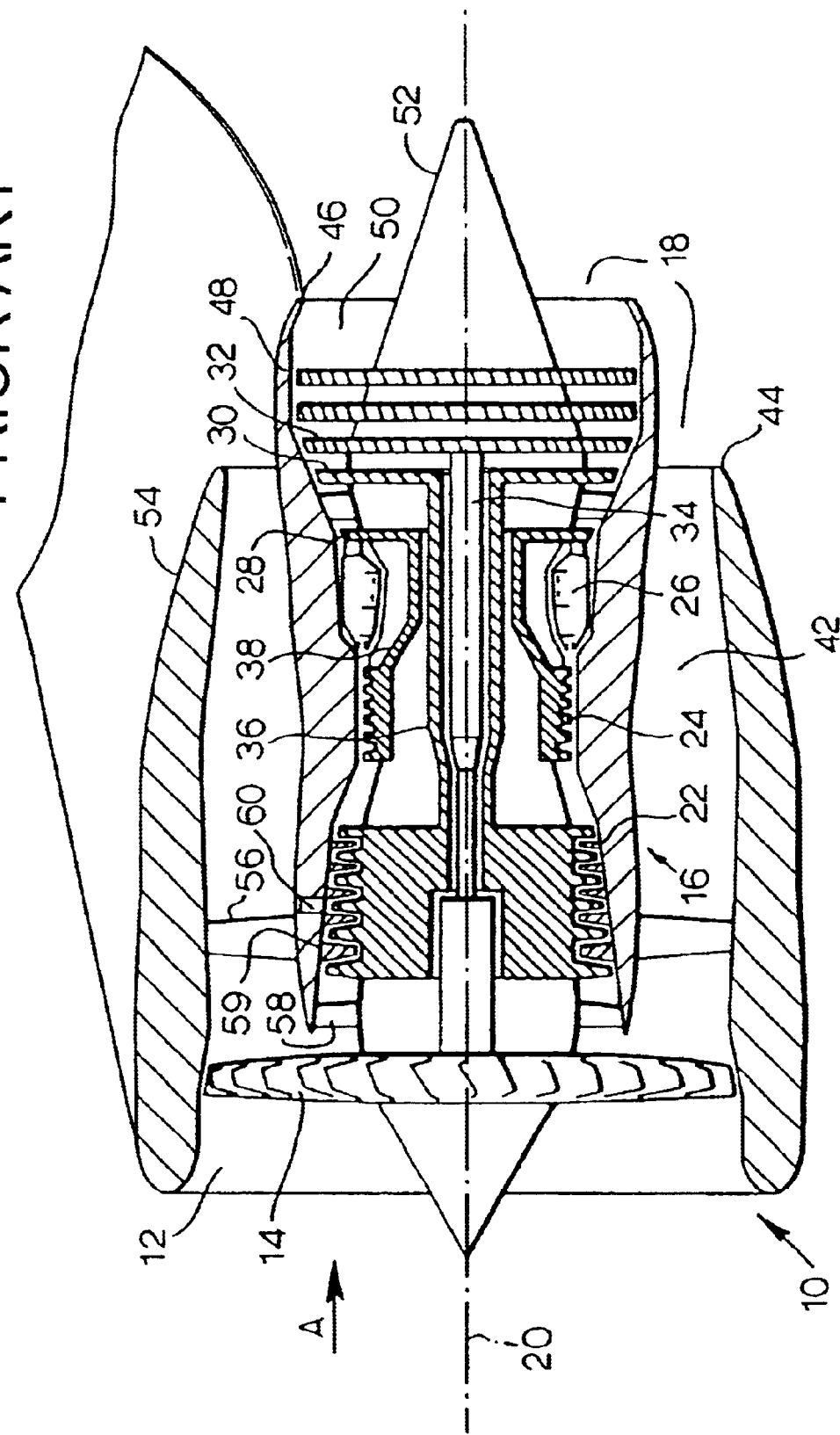
FIG. 1 is a schematic section of a ducted fan gas turbine engine comprising a prior art bleed valve.

With reference to FIG. 1, a ducted fan gas turbine engine 10 shown schematically comprises, in axial flow series an air intake 12, a propulsive low pressure fan 14, a core engine 16 and an exhaust nozzle assembly 18 all disposed about a central engine axis 20. The core engine 16 comprises, in axial flow series, an intermediate pressure compressor 22, a high pressure compressor 24, a combustor 26, and a high pressure turbine 28, an intermediate turbine 30 and a low pressure turbine 32. The direction of airflow through the engine 10, in operation, is shown by arrow A. Air is drawn in through the air intake 12 and is compressed and accelerated by the fan 14. The air from the fan 14 is split between a core engine flow and a bypass flow. The core engine flow enters core engine 16, flows through the core engine compressors 22, 24 where it is further compressed, and into the combustor 26 where it is mixed with fuel which is supplied to, and burnt within the combustor 26. Combustion of the fuel with the compressed air from the compressors generates a high energy and velocity gas stream which exits the combustor 26 and flows downstream through the turbines 28, 30, 32. As the high energy gas stream flows through the turbines it rotates turbine rotors extracting energy from the gas stream. The turbines 28, 30, 32 are drivingly connected to the compressors 22, 24 and the fan 14 via engine shafts 34, 36, 38 respectively. Having flowed through the turbines, the high energy gas stream from the combustor 26 still has a significant amount of energy and velocity and it is exhausted, as a core exhaust stream, through the engine exhaust nozzle assembly 18 to provide propulsive thrust. The remainder of the air from, and accelerated by, the fan 14 flows within a bypass duct 42 around the core engine 16. This bypass air flow, which has been accelerated by the fan 14, flows to the exhaust nozzle assembly 18 where it is exhausted, as a bypass exhaust stream to provide further, and in fact the majority of, the useful propulsive thrust of the engine 10.

The exhaust nozzle assembly 18 comprises two generally concentric sections, namely a radially outer bypass exhaust nozzle 44 and an inner core exhaust nozzle 46. The outer extent of the core exhaust nozzle 46 is defined by a core nozzle wall 48 and the inner extent of the core exhaust duct 50 is defined by an engine plug structure 52. A radially outer extent of the bypass exhaust nozzle 44 is defined by a generally frusto-conical nozzle wall 54 and is supported from the core engine 16 by an annular array of fan outlet guide vanes 56, which also act to straighten the fan bypass air flow. The nozzle wall 54 defines the outer extent of an annular bypass exhaust duct 42 through which the bypass fan flow is exhausted.

Referring to FIG. 2, in a multi-stage compressor 22, 24 of a gas turbine engine 10 each compressor stage 22, 24 is designed so that it operates as efficiently as possible over as wide a range of engine operating conditions as possible. This is shown by the working line 40 which the engine is designed to operate on or near to. However, there are some operating conditions, particularly transient stages between operating conditions, which depart from the capability of the compressor stage 22, 24 and there can be a breakdown of air flow and/or aerodynamically induced vibration occurs. If the engine 10 demands a pressure rise from a compressor 22 which is higher than can be sustained then "surge" occurs and here the engine 10 operates above a surge line 41. Surge is an instantaneous breakdown in air flow through the engine 10 and the high pressure air in the combustion system 26 is expelled forward through the compressors 24, 22 with a resultant loss of engine thrust. Compressors 22, 24 are therefore designed with an adequate "surge margin" to ensure that this instability is avoided. However, too great a surge margin leads to an inefficient engine 10 at constant operating conditions such as cruise, thus the surge margin is kept to a minimum.

Referring again to FIG. 1, to help reduce the surge margin variable inlet guide vanes 58 and variable stator vanes 59 may be used to provide an acceptable air angle on to the compressor blades to help prevent engine 10 surge. Furthermore bleed valves 60 are used between stages of the compressor 22 to further and quickly reduce the pressure therein by venting compressed air thereby restoring a workable flow of air through the engine and restoring the surge margin.

FIG. 3 is a section through a prior art bleed valve 60 which is disposed in operative association to a bleed hole 88 defined by an outer casing 49 of the core nozzle wall 48 and positioned radially outwardly of the intermediate pressure compressor 22. The core nozzle wall 48 is further defined by an inner casing 118, which defines bleed slots 120. Alternatively the bleed valve 60 may be disposed to the high pressure compressor (24 in FIG. 1) in a similar manner. The bleed valve 60 is generally cylindrical having a central valve axis 92 and comprises a static structure 70 and a movable structure 62 which are generally symmetrically disposed about the central axis 92. In essence the moveable structure 62, or piston, operates in a piston-like manner and is generally disposed within the static structure 70. The static structure 70 and piston 62 define or partially define first, second and third chambers 82, 84 and 86 respectively. The static structure 70 is defined by generally annular walls 72 and is enclosed at its distal end, to the bleed hole 88, by a further end wall 73. A generally annular flange 74 extends radially inwardly from the annular walls 72 to define an aperture 76. The annular flange 74 also partially defines second and third chambers 84, 86.

The moveable structure 62 is generally disposed within the static structure 70 and is arranged to translate generally parallel to the axis 92. The moveable structure 62 comprises a spindle 66, which extends parallel to axis 92 from a first end seal plate 90 to a valve face end plate 64. The spindle 66 is arranged to pass through aperture 76 and is sealed against the annular flange 74 by slidable sealing means 78 (as known in the art). The first seal plate 90 is sealed against the radially inner surface of the annular walls 72 by slidable sealing means 98 (as known in the art) and is disposed between the end plate 73 and the annular flange 74 thereby further defining the second and third chambers 84, 86 respectively.

The valve face end plate 64 extends from the spindle 66 radially outwardly (relative to the central valve axis 92) and beyond the annular walls 72 and is configured to radially overlap and cover the bleed hole 88 when in a closed position. A second annular wall 68 extends from the valve face end plate 64 in a generally parallel direction to the axis 92 and is disposed radially inwardly of the annular walls 72. However, it should be noted that the second annular wall 68 may alternatively be disposed radially outwardly of the annular walls 72. The second annular wall 68 terminates prior to the annular flange 74 and is sealed against the annular wall 72 by sealing means 80. The second annular wall 68 partly defines the first chamber 82 and is so configured to allow the first chamber 82 to vary its volume in accordance with the movement of the movable structure 62.

A passageway 100 is defined by the spindle 66 allowing fluid communication between the third chamber 86 and the compressor stage 22. Means for moving the piston 62 between the bleed valve 60 open position and the closed position is provided to the second chamber 84. In particular the means for moving the piston 62 comprises a pipe 102 which provides fluid communication between the second chamber 84 and a valve mechanism 116 which is controllable and is in operative association with a supply of pressurised air from a compressor 22, 24. Control of the valve mechanism to regulate the flow E of pressurised air into the second chamber 84 enables the piston 62 to move so as to open the bleed valve 60 as desired. The force exerted by the pressurised air in the second chamber 84 from airflow E is only required to overcome the force of exerted on the first seal plate 90 by the pressurised compressor 22 air in the third chamber 86. However, it is important that there is rapid balancing of pressures across the valve face end plate 64 so that the pressurised air flow E does not have to overcome a force exerted by the pressurised air in the first chamber 82.

To summarise the arrangement of the bleed valve 60, the first chamber 82 is defined by the static structure 70, the axial extending walls 68, the valve face end plate 64 and the flange 74 and is in fluid communication with the compressor 22 via pressure balancing apertures 106 defined in the valve face end plate 64. The third chamber 84 is defined by the static structure 70 and the first end plate 90 and is also in fluid communication with the compressor 22 via the passageway 100 defined by the spindle 66. The second chamber is defined by the static structure 70, the flange 74 and the first end plate 90.

The intermediate pressure compressor 22 comprises an annular array of stator vanes 94 mounted on and radially inwardly extending, relative to the main engine axis 20, from the inner casing 118 of the core nozzle wall 48. Axially between each annular array of stator vanes 84 is an annular array of blades 96 mounted on and radially outwardly extending, relative to the main engine axis 20, from a rotor disc (not shown). The bleed slots 120 are circumferentially disposed between some or all the stator vanes 84.

An operating cycle of the engine 10 comprises a non-working stage, a start up stage, an idling stage and a steady or normal operating condition. A steady condition may be at aircraft cruise conditions or maximum take-off thrust conditions. As the power of the engine 10 is changed from one steady condition to another the engine 10 undergoes a transient phase where surge may otherwise arise if it were not for the preventative measures such as the bleed valve 60. The bleed valve 60 helps to maintain a sufficiently rearward flow of air through the compressor 22, so that the engine 10 does not surge by releasing highly pressurised air from the compressor 22.

When the engine 10 is non-working the bleed valve 60 is in an open position as shown by the solid lines in FIG. 3. In this open position the moveable structure 62 is retained there by a helical spring 104 disposed between the annular flange 74 and first seal plate 90.

During the engine 10 started up stage, between the non-working and idle stage, air in the compressor 22 begins to flow through the inner casing 118 bleed slot 120, shown by arrow B, and then separates into flows shown by arrows C and D. During this stage the air pressure upstream of the bleed valve 60 increases and the pressure in the first chamber 82 is maintained at generally the same pressure as in the compressor stage 22 by compressed air flowing through the passageway 100. During this start up stage the valve mechanism 116 allows air to be vented from the second chamber 84 through the pipe 102. As the engine 10 approaches the idle stage the differential pressure between first and second chambers 82, 84 is sufficient to overcome the force exerted by the helical spring 104. The piston 62 is therefore forced radially inwardly, relative to the main engine axis 20, to assume a second closed position as shown by reference numeral 64' and the dashed lines in the figure. In this second and closed position the end face plate 64' of the first portion 62 abuts the core nozzle wall 48 thereby covering the orifice 88. When the bleed valve 60 is closed all the compressed air flowing through the bleed slot 120 is directed along arrow D and used for cooling in the turbines 28, 30, 32 or other engine 10 systems.

When the engine 10 and compressor 22 are operating under steady conditions the bleed valve 60 remains in the second closed position and the bleed valve 60 does not permit the flow of compressed air B therethrough.

During a transient stage when the pressure in the compressor 22 reaches a predetermined level, before the compressor stage 22 begins to stall, the valve face end plate 64 is forced from the second closed position to the first opened position (64'), permitting the flow C of compressed air. In turn, this increases the flow B out of the compressor 22 and reduces the pressure within the compressor 22 at that position. In this way a sudden increase in pressure across the compressor stage 22 is accommodated and the compressor stage 22 does not stall.

The force required to move the moveable structure 62 to the first position is provided by pressurised air regulated through the valve mechanism 116, which is commanded to respond to the detection of a predetermined pressure in the compressor 22, and into the second chamber 84. It is preferable to take the pressurised air flow E from a higher stage of the compressor, however, it is possible to use compressed air from the same compressor 22 stage. Where the compressed air is taken from the same compressor stage 22 the pressure in the second chamber 84 and the third chamber 86 are substantially similar, however, the resilient means 104 provides the required force to move the piston 62 of the bleed valve 60 into the open position.

It is important therefore that the bleed valve 60 opens and closes reliably and quickly. Unreliability of the bleed valve 60 may result in the loss of thrust from the engine 10 possibly leading to the engine 10 stalling. For the bleed valve 60 to operate effectively there is a need to equilibrate the air pressure between the first chamber 82 and the compressor stage 22, either side of the valve face end plate 64. Compressed air is therefore required to ingress and egress the first chamber 82 via pressure balancing holes 106. Furthermore the pressures within first and third chambers 82, 86 are required to be substantially similar. This is so that the compressed air supplied to the second chamber 84 is required only overcome the force of the compressed air in the third chamber 84 and the force required to expel the air from the first chamber 82 through the pressure balancing holes 106.

The pressure balancing holes 106 of the prior art bleed valve 60 are disposed at a radial distance from the spindle 66 which under most operating conditions is suitable for dissipating the pressure differential across the face end plate 64. It had been assumed that an equal pressure difference exists over the valve face end plate 64 and that the total area of the pressure balancing holes 106 was sufficient to allow the valve 60 to operate with the required speed. However, under certain operating conditions, the current design of these pressure balancing holes 106 is such that a significant radial differential pressure exists across the valve face end plate 64 and which causes undesirable opening and closing of the bleed valve 60. A current design comprises four symmetrically spaced pressure balancing holes 106 defined by the valve face end plate 64.

Figure 4:
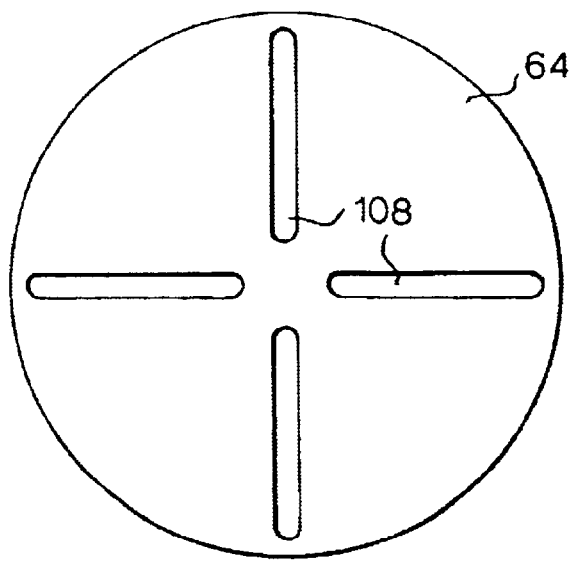
FIG. 4 is a view along arrow F on FIG. 3 and shows a face end plate of a bleed valve in accordance with the present invention.

FIG. 4 is a view on arrow F of a first embodiment of the present invention and shows a valve face end plate 64, which defines pressure balancing slots 108. The pressure balancing slots replace the prior art pressure balancing holes 106 and are arranged to significantly reduce the radial differential pressure gradient across the face end plate 64 and thereby provide a remedial solution to the aforementioned prior art problem. In particular, it is an important feature of the present invention that the slots 108 extend radially.

The arrangement of the pressure balancing slots 108, having a significant radial extent, provides improved radial pressure balancing across the valve face end plate 64 and ensures that the pressure at the back of the valve face end plate 64, i.e. the pressure gradient in the first chamber 82, is closer to the pressure gradient across the front of the valve face end plate 64 over the complete range of compressor 22 operational conditions. The present invention not only improves the responsiveness of the bleed valve 60 but also its reliability, by substantially eliminating any net pressure loading on the valve end plate 64.

Although FIG. 4 shows four symmetrically spaced pressure balancing slots 108 it is not intended that this number is restrictive and any suitable number of pressure balancing slots 108 may be defined by the face end plate 64. It is preferable however, although not essential that the pressure balancing slots 108 are symmetrically disposed about the face end plate 64. Similarly, it is preferable that the pressure balancing slots 108 extend substantially from the intersection of the spindle 66 and plate 64 to the periphery of the face end plate 64 where the second annular wall 68 extends from the plate 64.

Figure 5:
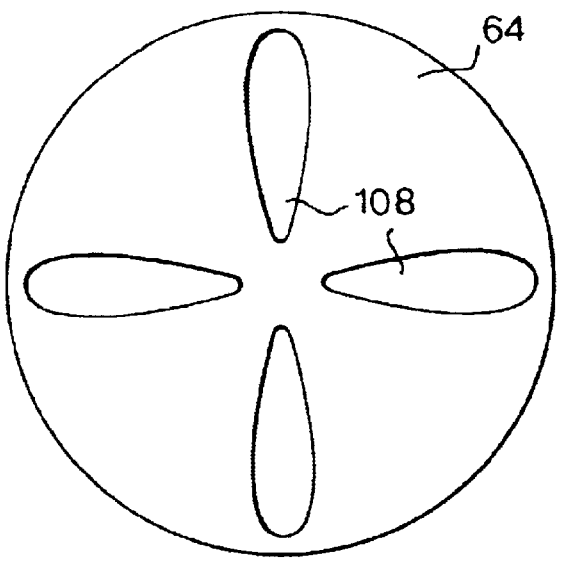
FIG. 5 is a view along arrow F on FIG. 3 and shows a second embodiment of the face end plate of a bleed valve in accordance with the present invention.
Figure 6:
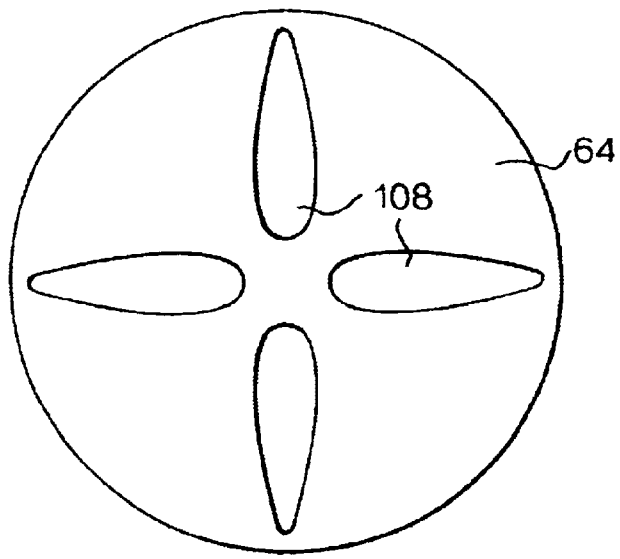
FIG. 6 is a view along arrow F on FIG. 3 and shows a third embodiment of the face end plate of a bleed valve in accordance with the present invention.

FIGS. 5 and 6 show alternative embodiments of the present invention. Although the pressure balancing slots 108 described herein comprise a constant width over their radial extent it should be appreciated that tapered slots may be used also. The tapering, which may be towards either the radially inner or outer end of the slot 108, is used to further optimise the response times to equilibrate the radial pressure differences across the face end plate 64. In particular the embodiment shown in FIG. 5 is beneficial in that the radially outward increase in slot width is able to accommodate the greater volume of air flow present, in use, at the outer periphery of the face end plate 64 than at the inner periphery. An ideal embodiment of the design in FIG. 5 is for the percentage of total slot width to total circumference of the plate 64 at any given radial position to be constant.

The pressure balancing slots 108 are an improvement over the prior art holes 106 as they are able to equilibrate the pressure across the valve face end plate 64 and thereby provide a more reliable bleed valve 60 which is also capable of reacting more rapidly. Simply moving the position of the prior art pressure balancing holes 106 would in fact increase the pressure differential at certain points in the engine flight cycle. Similarly, increasing the size of the prior art pressure balancing holes 106 would increase the pressure differential across the valve face end plate 64 and therefore further reduce the reliability of the bleed valve 60.

In some applications where there is no flow of air (arrow B in FIG. 3) in the region of the bleed valve 60 in the closed position it is possible to remove the face end plate 64 completely, however, this solution would offer too much disturbance to an air flow (arrow D) across the face end plate 64 of the bleed valve 60 when in a closed position. Hence there is a requirement for the face end plate 64 to cause as little air flow disturbance as possible by minimising the area of balancing bleed slots 108. The slots 108 are therefore of a minimum open area which permits the required response times for the bleed valve 60.

Although a helical spring 104 is used for a preferred embodiment of the present invention it is not intended to be a limiting component and any resilient means, such as a leaf spring or elastic member, which is capable of supplying a returning force to the piston 62 is suitable.

Although the present invention is described with reference to a substantially cylindrical bleed valve 60 it is possible to use other shapes, particularly those having a regular cross section, to equal effect.

It should also be understood that a method of operating a gas turbine engine 10 comprising a bleed valve 60 as described hereinbefore and comprises the steps of: when the engine 10 is not operating the bleed valve 60 is held in the open position by the force exerted by the resilient means 104; on engine 10 start up compressor air enters and pressurises the third chamber 86 sufficiently to overcome the force exerted by the resilient means 104 and forces the piston 62 to move between the open position and the closed position, thereby preventing compressor air passing through the bleed hole 88, during this step air is vented from the second chamber 84 via the means for supplying compressed air into and venting compressed air from the second chamber 102, 116; at a first normal operating condition of the engine 10 the bleed valve 60 is closed; during a transient engine 10 operating stage and when the pressure in the compressor 22 reaches a predetermined level the means for supplying compressed air 102, 116 is commanded to permit compressed air into the second chamber 84, at a sufficient pressure, to move the piston 62 between the closed position and the open position, thereby allowing compressor air to be exhausted through the bleed hole 88 and reducing the pressure in the compressor 22; during the transient engine 10 operating stage, between the first and a second normal operating condition, and when the pressure in the compressor 22 drops below the predetermined level the means for supplying compressed air 102, 116 is commanded to permit venting of compressed air from the second chamber 84, in so doing the pressure differential between the third chamber 86 and the second chamber 84 is sufficient to move the piston 62 between the open position and the closed position, thereby preventing compressor air exhausting through the bleed hole 88. In this way the compressor stage 22 is able to operate without surge occurring during the transient stage. Typically the first normal engine condition is idle and the second engine operation is maximum take-off power. Alternatively the first engine operating condition may be aircraft cruise engine speed and the second operating condition is flight idle.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A bleed valve for regulating a fluid flow through a bleed hole, wherein the bleed hole is defined by a casing of a gas turbine engine compressor, the bleed valve comprises a central axis, a piston and a static structure, the static structure generally surrounds the piston, and is arranged to define in axial sequence from the bleed hole first, second and third chambers, the piston comprises a spindle, walls, a first end plate slidably sealed against the static structure and a valve face end plate from which the walls axially extend, the walls being slidably sealed to the static structure, the static structure comprises a radially inwardly extending flange, the flange defining an aperture through which the spindle axially extends and is slidably sealed against, wherein said first chamber is in fluid communication with the compressor via pressure balancing apertures defined in the valve face end plate, said third chamber is also in fluid communication with the compressor via a passageway defined by the spindle, the bleed valve further comprising means for moving the piston between an open position and a closed position, wherein the valve face end plate has an outer peripheral edge and a center with said pressure balancing apertures comprising elongated slots each extending from adjacent said center to adjacent said peripheral edge of said face end plate.

2. A bleed valve as claimed in claim 1 wherein the means for moving the piston comprises a means for supplying compressed air into and venting compressed air from the second chamber, such that supplying compressed air moves the piston between the open position and the closed position, and a resilient member disposed to and between the flange and the first end plate and which is arranged to provide a returning force to the piston to move the piston between the closed position and the open position.

3. A bleed valve for regulating a fluid flow through a bleed hole, wherein the bleed hole is defined by a casing of a gas turbine engine compressor, the bleed valve comprises a central axis, a piston and a static structure, the static structure generally surrounds the piston, and is arranged to define in axial sequence from the bleed hole first, second and third chambers, the piston comprises a spindle, walls, a first end plate slidably sealed against the static structure and a valve face end plate from which the walls axially extend, the walls being slidably sealed to the static structure, the static structure comprises a radially inwardly extending flange, the lange defining an aperture through which the spindle axially extends and is slidably sealed against, said first chamber is in fluid communication with the compressor via pressure balancing apertures defined in the valve face end plate, said third chamber is also in fluid communication with the compressor via a passageway defined by the spindle, the bleed valve further comprises means for moving the piston between an open position and a closed position, wherein the valve face end plate comprises radially extending pressure balancing apertures wherein the radially extending pressure balancing apertures substantially extend from the spindle to the axial walls.

4. A bleed valve as claimed in claim 3 wherein the radially extending pressure balancing apertures comprise a constant aperture width.

5. A bleed valve as claimed in claim 3 wherein the radially extending pressure balancing apertures comprise an aperture width which tapers radially inwardly.

6. A bleed valve as claimed in claim 3 wherein the radially extending pressure balancing apertures comprise an aperture width which tapers radially outwardly.

7. A bleed valve as claimed in claim 1 wherein the radially extending pressure balancing apertures are symmetrically disposed around the valve face end plate.

8. A bleed valve as claimed in claim 1 wherein the casing is a casing surrounding a compressor stage of a gas turbine engine.

9. A gas turbine engine comprising a bleed valve as claimed in claim 1.

10. A method of operating a gas turbine engine comprising a bleed valve for regulating a fluid flow through a bleed hole, the bleed hole being defined by a casing of a gas turbine engine compressor, the bleed valve comprising a central axis, a piston and a static structure, the static structure surrounding the piston and arranged to define by wall members in axial sequence from the bleed hole first, second and third chambers, said valve including a valve face end plate, the piston including a spindle, walls, a first end plate slidably sealed against the static structure with the first chamber being in fluid communication with the compressor through pressure balancing apertures defined in the valve face end plate with said apertures comprising elongated, radially extending slots having a radial dimension greater than a width dimension and extending from adjacent said central axis outwardly, the third chamber being in fluid communication with the compressor through a passageway defined by the spindle, a supply of compressed air for the second chamber and a bleed hole for venting the compressed from the second chamber where the supplying of compressed air moves the piston between an open position and the venting of the compressed air moves the piston to a closed position, a resilient member disposed to and between a flange and the first end plate and which provides returning force to the piston to move the piston between the closed and open positions, comprising the steps of:

when the engine is not operating the valve being held in the open position by the force exerted by the resilient member;

wherein on engine start up compressor air enters and pressurises the third chamber sufficiently to overcome the force exerted by the resilient member and forces the piston to move between the open position and the closed position, thereby preventing compressor and air passing through the bleed hole, during this step air being vented from the second chamber via the means for supplying compressed air into and venting compressed air from the second chamber;

at a first normal operating condition of the engine the bleed valve being closed;

during a transient engine operating stage, between the first and a second normal operating conditions, and when the pressure in the compressor reaches a predetermined level the means for supplying compressed air being commanded to permit compressed air into the second chamber, at a sufficient pressure, to move the piston between the closed position and the open position, thereby allowing compressor air to be exhausted through the bleed hole and reducing the pressure in the compressor;

during the transient engine operating stage and when the pressure in the compressor drops below the predetermined level the means for supplying compressed air being commanded to permit venting of compressed air from the second chamber, in so doing the pressure differential between the third chamber and the second chamber becoming sufficient to move the piston between the open position and the closed position, thereby preventing compressor air exhausting through the bleed hole.

* * * * *